United States Patent [19]
Wilhelm

[11] Patent Number: 5,803,754
[45] Date of Patent: Sep. 8, 1998

[54] MODIFIED RECEPTACLE AND PLUG FOR LOW VOLTAGE DC DISTRIBUTION

[75] Inventor: William George Wilhelm, Mastic, N.Y.

[73] Assignee: Nextek Power Systems Inc., Shirley, N.Y.

[21] Appl. No.: 820,497

[22] Filed: Mar. 19, 1997

Related U.S. Application Data

[63] Continuation-in-part of Ser. No. 606,219, Mar. 7, 1996, which is a continuation-in-part of Ser. No. 328,574, Oct. 24, 1994, Pat. No. 5,500,561, which is a continuation of Ser. No. 129,375, Sep. 29, 1993, Pat. No. 5,363,333, which is a continuation of Ser. No. 944,796, Sep. 14, 1992, abandoned, which is a continuation of Ser. No. 638,637, Jan. 8, 1991, abandoned.

[51] Int. Cl.$^6$ ............................................. H01R 4/66
[52] U.S. Cl. .............................................. 439/107; 439/956
[58] Field of Search .................................... 439/107, 106, 439/105, 104, 956

[56] References Cited

U.S. PATENT DOCUMENTS

| | | | |
|---|---|---|---|
| 2,994,849 | 12/1961 | Mussari | 339/159 |
| 3,123,424 | 3/1964 | Williams | 339/195 |
| 3,478,295 | 11/1969 | Grieshaber | 439/107 OR |
| 3,739,318 | 6/1973 | Wise | 339/14 P |
| 3,938,068 | 2/1976 | Hagan | 439/956 X |
| 4,019,797 | 4/1977 | Prami | 439/107 OR |
| 4,025,822 | 5/1977 | Hughes et al. | 361/45 |
| 4,426,587 | 1/1984 | Nouet | 307/66 |
| 4,579,405 | 4/1986 | Hirooka | 339/14 L |
| 4,857,013 | 8/1989 | Peters | 439/484 |
| 4,860,185 | 8/1989 | Brewer et al. | 363/41 |
| 5,089,937 | 2/1992 | Carrubba | 361/394 |
| 5,164,609 | 11/1992 | Poppe | 307/147 |
| 5,268,850 | 12/1993 | Skoglund | 364/480 |
| 5,465,013 | 11/1995 | Bassen | 307/91 |
| 5,481,140 | 1/1996 | Maruyama et al. | 307/11 |
| 5,532,525 | 7/1996 | Kaiser | 307/64 |

*Primary Examiner*—P. Austin Bradley
*Assistant Examiner*—Daniel Wittles
*Attorney, Agent, or Firm*—Alfred M. Walker

[57] ABSTRACT

An receptacle for low voltage DC applications includes a receptacle surface in which are located only one pair of female connections. One of the female connections is a terminal normally connected to the neutral line of an AC power grid, and the other of the female connections is a terminal connected to a ground line of an AC power grid. The two connections are arrayed to correspond with the neutral and positive terminals of a conventional three prong AC receptacle.

15 Claims, 2 Drawing Sheets

FIG. 1
(PRIOR ART)
FIG. 2
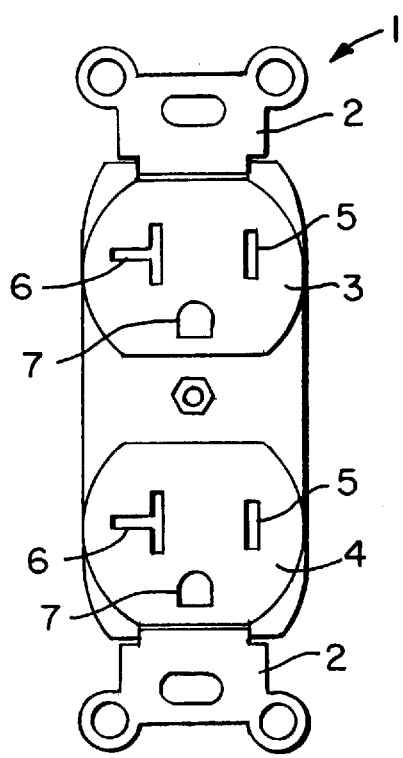
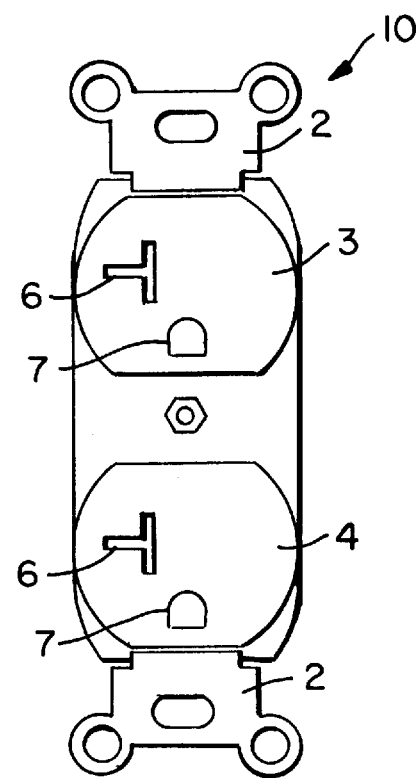
FIG. 3
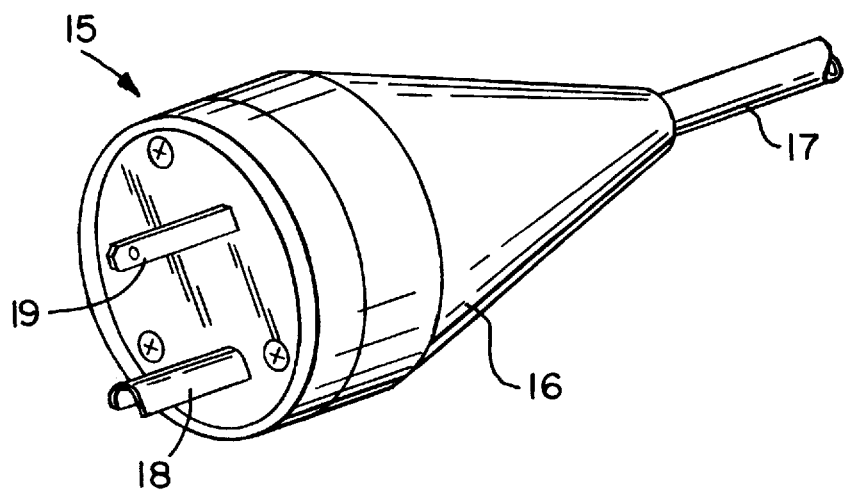

5,803,754

MODIFIED RECEPTACLE AND PLUG FOR LOW VOLTAGE DC DISTRIBUTION

This application is a continuation-in-part of application Ser. No. 08/606,219 filed Mar. 7, 1996, which is a continuation-in-part of application Ser. No. 08/328,574, filed Oct. 24, 1994, now U.S. Pat. No. 5,500,561 dated Mar. 19, 1996, which was a continuation of application Ser. No. 08/129,375, filed Sep. 29, 1993 now U.S. Pat. No. 5,363,333, which is a continuation of application Ser. No. 07/944,796, filed Sep. 14, 1992abandoned, which is a continuation of application Ser. No. 07/638,637, filed Jan. 18, 1991, abandoned.

BACKGROUND OF THE INVENTION

The field of this invention is modified receptacles for distribution of low voltage DC in households and buildings and mating plugs for DC appliances.

Standard 3-prong grounded plugs that plug into mating outlets are commonplace. The prior art shows several variations. U.S. Pat. No. 3,739,317 of Wise describes a variety of configurations of a ground pin on a plug to permit equipment grounding when using two-wire or three-wire receptacles. U.S. Pat. No. 4,025,822 of Hughes et al. discloses a two to three-wire converter circuit to insure that an appliance is properly grounded. U.S. Pat. No. 4,857,013 of Peters describes an electrical attachment plug of very low profile. U.S. Pat. No. 3,123,424 of Williams discloses an electrical plug with anti-shock prongs. U.S. Pat. No. 2,994,849 of Mussari discloses an electrical plug-in connector which provides both standard 115 volt outlets as well as 230 volt receptacles.

None of the prior art relates to the present invention.

OBJECTS OF THE INVENTION

It is an object of this invention to use modified receptacles and mating plugs to facilitate safe and convenient distribution and use of DC power (12 to 40 volts or higher) in normal household and building environments.

It is another object to minimize the capital outlay in manufacture of these devices by limiting the tooling costs.

SUMMARY OF THE INVENTION

An improved receptacle for low voltage DC applications includes a receptacle surface in which are located only one pair of female connections. One of the female connections is a terminal normally connected to the neutral line of an AC power grid, and the other of the female connections is a terminal connected to a ground line of an AC power grid.

The two connections are arrayed to correspond with the neutral and ground terminals of a conventional three prong AC receptacle.

Optionally, the positive female connection is curved in cross section, such as a circle or an arc, and the negative female connection is rectangular in cross section, therefore shaped to correspond with the terminals of a conventional three prong AC receptacle.

To connect to the female receptacle, a male connector plug for low voltage DC includes a surface having thereon only a neutral prong and a ground prong. The neutral and ground prongs are arranged and shaped to engage the neutral and ground female connections on an AC receptacle, to prevent making contact with any live AC electrical power in the AC receptacle. A source of DC electrical power is connected across the two connections.

BRIEF DESCRIPTION OF THE DRAWINGS

The present invention can best be understood in conjunction with the accompanying drawings, in which:

FIG. 1 is a front view of a prior art duplex receptacle;

FIG. 2 is a front view of a duplex receptacle of this invention;

FIG. 3 is a perspective view of a mating plug;

DETAILED DESCRIPTION OF THE DRAWINGS

Figure 4:
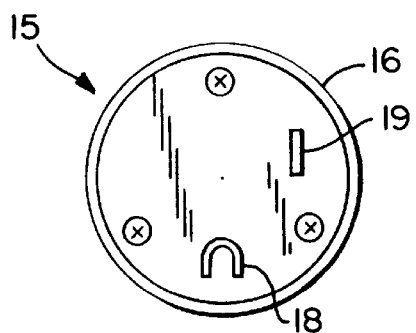
FIG. 4 is an end view of the mating plug.

It is desirable to use DC appliances and lighting fixtures in a system which saves energy and provides for uninterrupted service during utility power outages. A safe and convenient method for distributing this DC service is to provide wall mounted receptacles and mating appliance plugs not unlike those available for standard 115 volts AC service.

FIG. 1 shows a front view of a model NOM057 duplex outlet made by Leviton. This particular model has an isolated ground in which the neutral contact 6 of either the top 3 or bottom 4 outlet is isolated electrically from ground female connections 7. Metal mounting ears 2 are used to facilitate wall mounting in enclosures.

This type of outlet can be used to distribute DC power by using the ground connections 7 as the + terminal and the neutral connection 6 as the − terminal. The "hot" connection 5, which corresponds to the high AC side, would not be used. Although an AC appliance can be plugged in to such a DC receptacle, no damage should occur although the AC appliance would not work.

In an effort to prevent an AC appliance from being plugged into a DC receptacle and also to identify the DC outlets visually, this invention eliminates the unused "hot" high AC side female connector as shown in FIG. 2. The modified receptacle 10 just has connections in the familiar ground position 7 (now a + terminal) and the neutral positions 6 (now the − terminal), though in principle they may be reversed. This change incurs minimal tooling costs since the mold modifications for this change are quite simple.

FIG. 3 shows a mating two prong plug 15. It has a normal sized housing 16, a "ground pin" 18 (now used as the + connection) and a "neutral" spade connector 19 (now used as the − connection). Although a normal 3-prong plug could have been used in a standard 3-prong receptacle for this service, the two prong plug offers a visual indication that this is a DC appliance which must be plugged into a DC receptacle for proper operation. (A two prong plug can be inserted in a standard 3-prong AC socket without damage to the DC appliance since there is usually no potential difference between neutral and ground, however the DC appliance will not operate in an AC outlet.) By using standard AC components as the starting point for the modified DC plug, no tooling costs are incurred. The "hot" high AC side spade connector is simply not inserted in the plug during manufacture. FIG. 4 shows an end view of this configuration.

Figure 5:
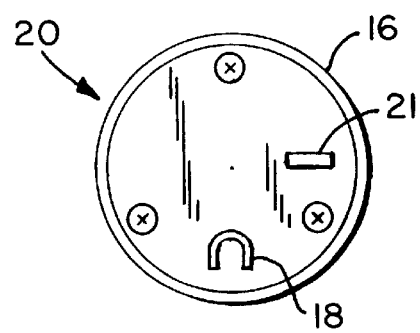
FIG. 5 is an end view of alternate embodiment of a mating plug.

FIG. 5 shows the configuration of an alternate embodiment 20 of the DC plug using a spade terminal 21 that is rotated 90 degrees for the − terminal. DC plug 20 also mates with duplex receptacle 10. Since most commonly used receptacles do not have a "T" shaped connector 6 for "neutral" as shown in FIG. 2, this plug 20 would not be pluggable into most AC outlets or receptacles. This would be an advantage over the plug 15 of FIGS. 3 and 4.

Although a duplex receptacle is shown in FIG. 2, a single or quad or other common versions of wall mounted or cable attached receptacles can be configured using only the "neutral" and "ground" female connectors.

Figure 6:
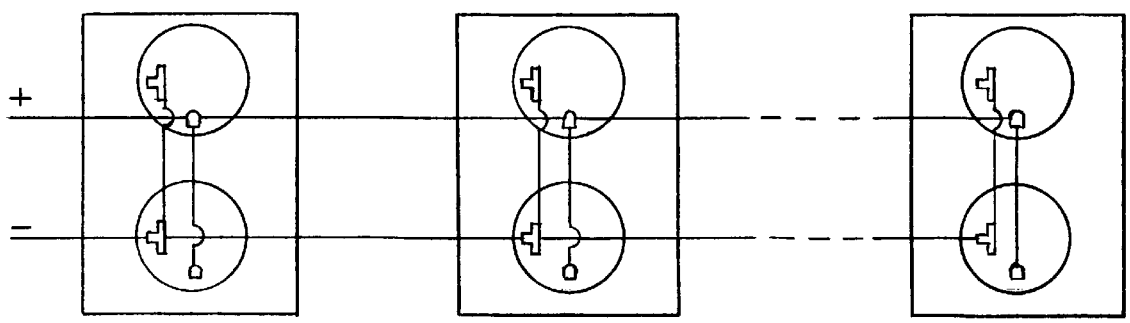
FIG. 6 is a schematic wiring diagram of the present invention.

Moreover, FIG. 6 shows a wiring diagram of the plug and receptacle of the present invention.

However, it is noted that other modifications may be made to the present invention, without departing from the scope of the invention, as noted in the appended claims.

I claim:

1. A receptacle for low voltage DC power applications comprising:

at least one receptacle surface in which are located only a single pair of female connections;

first female connection of said single pair of female connections being a terminal normally connected to the neutral line of an AC power grid;

a second female connection of said single pair of female connections being a terminal connected to a ground line of said AC power grid; and said single pair of female connections being arrayed to correspond with the neutral and ground terminals of a three prong AC receptacle.

2. The receptacle as in claim 1 wherein said first female connection terminal normally connected to the neutral line of an AC power grid is used as a negative terminal for said low voltage DC power applications, and said second female connection terminal normally connected to the ground line of an AC power grid is used as a positive terminal for said low voltage DC power applications.

3. The receptacle of claim 2 wherein said positive female connection terminal is curved in cross section and said negative female connection terminal is rectangular in cross section said connection terminals being shaped to correspond with the terminals of said three prong AC receptacle.

4. The receptacle of claim 3 wherein said positive female connection terminal is arcuate in cross section.

5. The receptacle of claim 3 wherein said positive female connection terminal is circular in cross section.

6. The receptacle as in claim 1 wherein said at least one receptacle surface comprises a plurality of receptacle surfaces, each said receptacle surface having only said single pair of female connections, and each said single pair of female connections being isolated and separated from each other single pair of female connections.

7. The receptacle as in claim 1 wherein said first female connection terminal normally connected to the neutral line of an AC power grid is used as a positive terminal for said low voltage DC power applications, and said second female connection terminal normally connected to the ground line of an AC power grid is used as a negative terminal for said low voltage DC power applications.

8. The receptacle of claim 7 wherein said negative female connection terminal is curved in cross section and said positive female connection terminal is rectangular in cross section, said connection terminals being shaped to correspond with the terminals of said three prong AC receptacle.

9. The receptacle of claim 8 wherein said negative female connection terminal is arcuate in cross section.

10. The receptacle of claim 7 wherein said negative female connection terminal is circular in cross section.

11. A male connector plug for low voltage DC power comprising:

a surface having thereon and extending therefrom only a neutral prong and a ground prong;

said neutral and ground prongs arranged on said male connector and shaped to engage the neutral and ground female connections on an AC electrical power receptacle to prevent making contact with any live AC electrical power in said AC electrical power receptacle.

12. The male connector plug as in claim 11 wherein said neutral prong is used as a positive connector for said low voltage DC power applications and said ground prong is used as a negative connector for said low voltage DC power applications.

13. The male connector plug as in claim 11 wherein said neutral prong is used as a negative connector for said low voltage DC power applications and said ground prong is used as a positive connector for said low voltage DC power applications.

14. A receptacle assembly for low voltage DC electrical power applications comprising:

a receptacle having at least one receptacle surface in which is located only a single pair of female connections;

a first connection of said female connections being a terminal normally connected to the neutral line of an AC power grid;

a second connection of said female connections being a terminal normally connected to a ground line of said AC power grid;

a source of DC electrical power connected across said first and second female connections;

said first and second female connections being arrayed to correspond with the neutral and ground terminals of a three prong AC receptacle;

a male connector with a surface having thereon and extending therefrom only a neutral prong and a ground prong for engaging said receptacle;

said neutral and ground prongs arranged and shaped to engage the neutral and ground female connections on said receptacle to prevent making contact with and being exposed to any live AC electrical power in said receptacle.

15. The receptacle assembly as in claim 14 wherein said at least one receptacle surface comprises a plurality of receptacle surfaces, each said receptacle surface having only said single pair of female connections, and each said single pair of female connections being isolated and separated from each other single pair of female connections.

\* \* \* \* \*